T. H. COSTELLO.
GLOBE YOKE.
APPLICATION FILED JUNE 10, 1908.
945,378.
Patented Jan. 4, 1910.
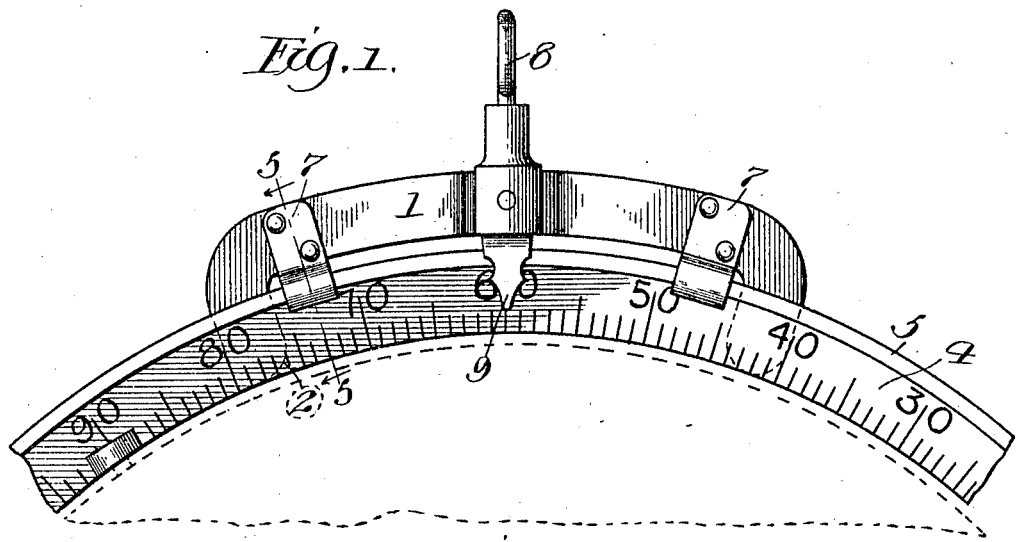
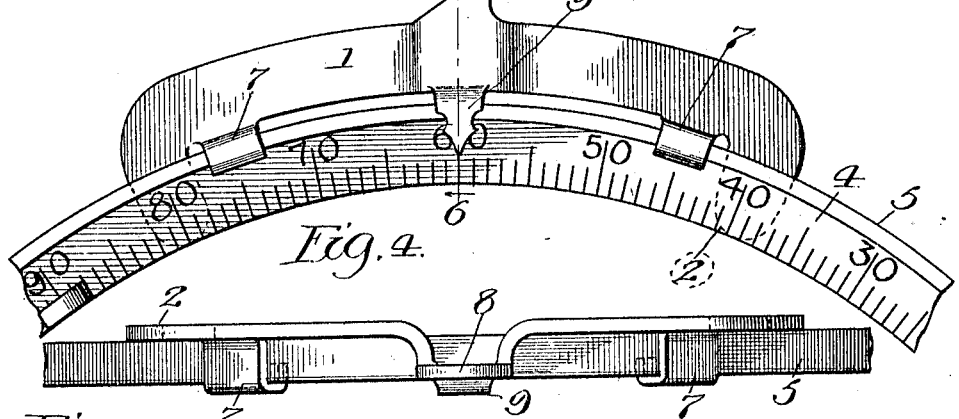
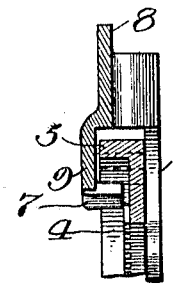
Witnesses
Inventor
Thomas H Costello
by Chamberlain atty

UNITED STATES PATENT OFFICE.

THOMAS H. COSTELLO, OF CHICAGO, ILLINOIS.

GLOBE-YOKE.

945,378.   Specification of Letters Patent.   Patented Jan. 4, 1910.

Application filed June 10, 1908. Serial No. 437,699.

*To all whom it may concern:*

Be it known that I, THOMAS H. COSTELLO, a citizen of the United States, residing at the city of Chicago, in the county of Cook and State of Illinois, have invented a new and useful Improvement in Globe-Yokes, of which the following is a specification.

My invention relates to devices for globe suspension and provides a means whereby the meridian ring of such globe may be suitably engaged by a balanced device and whereby the points and lines of suspension shall be so arranged that all clamping or binding of the parts will be avoided and free and smooth movement permitted for relative adjustment as desired.

It also provides a device which is simple and cheap, which is free from complication of parts and is readily applied and adjusted.

The principles of my invention are illustrated in the drawings in which—

Figure 1 and Fig. 3 represent front views of my invention in two different forms. Figs. 2 and 4 represent respectively top views of the same. Fig. 5 is a cross section on line 5—5 of Fig. 1 and Fig. 6 is a cross section on line 6—6 on Fig. 3.

Further describing my invention with reference to the drawings, 1 is a yoke having the downturned ends 2, such ends being adapted to bear against the one side of the globe meridian 4—4. That illustrated in the drawings is what is known as a "single faced meridian" and is provided with a flange 5 on the face thereof. This flange is the means by which the rings and inclosed globe are supported, such flange being engaged by the clips 7—7 carried by the yoke 1. These may be integrally formed as shown in Fig. 3 or may be applied to the yoke and secured thereto by rivets or bolts as illustrated in Fig. 1. As such clips pass to the front of and around the flange 5, the point of suspension is carried forward of the plane of the yoke and to give a proper balance the suspending hook 8 is offset until the balance is obtained which will be in practically the same vertical plane as the points of engagement between the clips and the under sides of the flanges. This may be done by giving a proper bend or offset to the yoke.

The supporting hooks as well as the pointers 9 may be integrally formed on the yoke as shown in Fig. 3 or may be in separate pieces as illustrated in Fig. 1. Preference, however, should be given to the integral construction on account of its simplicity, cheapness and lack of liability of the parts to become disarranged in use.

I claim:—

1. In a globe suspending device; the combination with a meridian of a body portion constituting a yoke disposed substantially parallel to said meridian, integrally formed downwardly projecting members on the ends of said yoke adapted to bear on one side of said meridian ring, and members on the yoke adapted to engage on the other side of said meridian.

2. In a globe suspending device; the combination with a meridian of a body portion constituting a yoke disposed substantially parallel to the meridian, a suspending member thereon, integrally formed means on the yoke for engaging the meridian on one side thereof and integrally formed means on the yoke for engaging the meridian on the other side thereof, said engaging means being spaced from each other by the body portion of the yoke.

3. A suspending device for single flanged globe meridians consisting of a body portion constituting a yoke, and provided with downwardly projecting ends spaced from each other by said body portion to bear on the plane side of the meridian ring, and integrally formed lugs downwardly projecting from the yoke and adapted to engage beneath the flange on the other side of the ring.

4. In a globe suspending device the combination of a ring having a plane and a flanged face, a balancing yoke, means thereon to bear on the plane face of the meridian ring, means on said yoke to engage beneath the flange of said ring, and a suspending member off-set into the plane of such engagement.

5. In combination with a globe meridian ring having a plane face, a supporting yoke therefor having downturned ends to bear on the plane face of the ring, means for attaching the ends of said yoke to the meridian out of its normal plane of suspension, and a suspending member off-set from the plane of the yoke.

6. In combination with a globe meridian ring having a plane and a flanged face, a supporting yoke therefor having downturned ends to bear on one side of the meridian, lugs on the yoke to engage the other side of the meridian and support the same, and a suspending means on the yoke offset toward the vertical plane of engagement of said lugs with the meridian ring.

7. A globe suspending device consisting of a balancing yoke, members thereon adapted to bear on one side of a single flanged meridian ring, means on the yoke for engaging beneath the flange of said ring, and a suspending member offset substantially into the vertical plane of such engagement.

8. The globe suspending device consisting of a balancing yoke having a centrally offset portion, members on said yoke adapted to bear on one side of a single flanged meridian ring, means on the yoke for engaging beneath the flange of said ring, and a suspending member attached to said offset portion of the yoke, substantially as set forth.

THOMAS H. COSTELLO.

Witnesses:
C. K. CHAMBERLAIN,
STELLA S. JONES.